3,098,872
PRODUCTION OF NITROUREA
Martin L. Weakley, Sam M. Moffett, and Louis E. Craig, Pryor, Okla., assignors, by mesne assignments, to Deere & Company, a corporation of Delaware
No Drawing. Filed Mar. 6, 1958, Ser. No. 719,498
1 Claim. (Cl. 260—553)

This invention relates to an improved process for producing nitrourea.

Prior art methods of producing nitrourea which have been of any practical significance have been based upon the synthesis, isolation, and purification of urea nitrate and the addition of that urea nitrate, in solid form, to sulfuric acid or acetic anhydride, followed by recovery of nitrourea. None of the prior methods of manufacturing nitrourea have, however, been completely satisfactory. For example, urea nitrate must be prepared under very carefully controlled conditions, reaction temperatures must be maintained very low to avoid excessive decomposition, and there is, besides, considerable danger involved in the handling of urea nitrate.

While the direct nitration of urea suggests itself as one way of avoiding the aforesaid roundabout method of producing nitrourea, all attempts at such direct nitration have been found to be signally impractical due, at least to an important extent, to the decomposition of nitrourea which occurs during the processing.

The present invention is, accordingly, directed to a method and technique whereby nitrourea can be produced rapidly, economically, in excellent yield and with less vigilant control over operating conditions than the prior art methods required. Using our invention, yields of up to 80 to 90% theory of nitrourea are not uncommon; furthermore, our process is quite readily adaptable to either batch or continuous procedures.

In general, our invention involves the nitration of a sulfuric acid solution of urea followed by recovery of nitrourea from the reaction mix.

More specifically, our process involves the dissolution of urea in concentrated sulfuric acid or in a sulfuric acid-oleum mixture at a temperature of between about 0° and 100° C., preferably 0° to 35° C., followed by the addition thereto of nitric acid, preferably in anhydrous condition. We have found that with our procedure no appreciable decomposition of nitrourea occurs, due, apparently, to the readiness with which heat of solution is dissipated. Considering the fact that the solution of urea in concentrated sulfuric acid or in a sulfuric acid-oleum mixture is mixed with nitric acid, it is seen that the combination of the reactants as liquids results in more rapid and more intimate mixing without the danger of excessive localized heating such as would be the case where a solid product or products were used as the reactants. After the nitration effected by addition of the nitric acid has taken place, the reaction mixture is diluted with ice and/or cold water, and the precipitated nitrourea recovered in any conventional way, as by filtration, centrifugation or the like. The resulting nitrourea may be purified further by recrystallization from suitable solvents such as isopropyl alcohol or acetic acid.

For best results, we have found that quantities of concentrated sulfuric acid (specific gravity 1.84) in excess of about 425 parts per 60 parts by weight of urea should be used to dissolve the urea. Still further improvement in results is obtained when a portion, preferably around 30% by volume of the concentrated sulfuric acid used for dissolving the urea is replaced by oleum. In either case, after sufficient time has elapsed after addition of the nitrating acid, preferably concentrated nitric acid, or fuming nitric acid, desirably with the addition of oleum, the reaction mixture, maintained at a temperature of around —5° C. to +10° C., is diluted by adding ice or cold water using about 2.5 parts of ice or water per 1 part of sulfuric acid; this serves not only to free nitrourea from the acid solution, but also to dissipate the heat of solution. Quantities of water, very much in excess of the foregoing should generally be avoided since it has been found that use of excessive amounts of liquid for drowning results in a reduction in yield. In carrying out the nitration we prefer to use about 70 parts of nitric acid per 60 parts of urea, this being a 10% excess of nitric acid. Fuming nitric acid substituted for ordinary nitric acid results in improved yields.

While our technique is perfectly suitable for batch operations, it is also adaptable, as already pointed out, to continuous procedures. In the latter case, the sulfuric acid solution of urea is mixed continuously with nitric acid in a reactor equipped with cooling means, and the resulting solution, after a residence time of around 5 to 30 minutes, at about —5° C. to +10° C. is drowned in cold water or ice using, for example, about 2.5 parts of ice or ice-cold water for 1 part of sulfuric acid.

Our invention will be further illustrated by reference to the following detailed examples which are intended to be illustrative only and not to be construed in a limiting sense:

*Example I*

A reactor vessel provided with suitable cooling coils for cooling the contents thereof was charged with 427 parts of concentrated sulfuric acid (sp. gr. 1.84) and after the acid temperature dropped to 0° C., 60 parts of urea (1.0 mole) was added in small portions keeping the temperature between 0 and 3° C. At the same temperature, 101 parts of concentrated nitric acid (69% $HNO_3$, 1.1 moles) was added dropwise with stirring and continued for a total time of 30 minutes, after which the reaction solution was poured, with vigorous stirring, into 517 parts of ice. Filtration of the resulting precipitate gave a 54.7% yield of nitrourea.

*Example II*

The procedure of Example I was followed except that 60 parts of urea (1.0 mole) was added to 854 parts of sulfuric acid (sp. gr. 1.84) at a temperature of about 0° C., after which 101 parts of concentrated nitric acid (69% $HNO_3$, 1.1 moles) was added dropwise, with stirring, continuing for 30 minutes. After this, the reaction mixture was poured into 960 parts of ice. The resulting precipitate of nitrourea showed a yield of 59.4% of theory.

*Example III*

In a conventional reaction vessel fitted for stirring and for cooling the contents thereof, 60 parts of urea (1.0 mole) was dissolved, with vigorous stirring, in 427 parts of concentrated sulfuric acid (sp. gr. 1.84) at about —10° C. To this solution 77.3 parts of fuming nitric acid (90% $HNO_3$, 1.1 moles) was added over a period of twenty minutes, and the stirring continued for an additional 30 minutes. The reaction mixture was then poured, with vigorous stirring, into 563 parts of crushed ice and the precipitated nitrourea recovered, in a yield of 77.8%.

*Example IV*

The procedure of Example I was followed except that 60 parts of urea (1.0 mole) was dissolved in 202 parts of concentrated sulfuric acid (sp. gr. 1.84) at 0° C. At that temperature 77.3 parts of fuming nitric acid (90% $HNO_3$, 1.1 moles) was dissolved in 326 parts of fuming sulfuric acid (30% $SO_3$) and the resulting solution was added dropwise to the urea solution at the same temperature. After stirring for an additional 30 minutes the reaction mixture was poured with vigorous stirring into 1640 parts of ice; the yield of nitrourea, recovered by filtration, was 80.2%.

Example V

To commercial mixed acid, composed of 36% nitric acid and 61% sulfuric acid, was added with vigorous stirring at 0° C. or below, 60 parts of urea; the addition took 30 minutes and the mixture, containing considerable solid matter, was stirred for an additional 30 minutes. The reaction mixture was added with vigorous stirring, to 329 parts of ice and the product recovered by filtration, showed a yield of 17.1% nitrourea.

Example VI

In this example the total requirement of sulfuric acid was reduced by substituting a portion of the sulfuric acid used as the solvent for urea with a portion of the oleum added as a dehydration agent.

One solution was prepared by combining 77.3 parts of fuming nitric acid (90% $HNO_3$, 1.1 moles) with 262 parts of oleum (31.5% $SO_3$) at 30 to 35° C.

A second solution was prepared by adding 60 parts of urea (1.0 mole) to a mixture of 100 parts of oleum (31.5% $SO_3$) and 114 parts of concentrated sulfuric acid (sp. gr. 1.84) at 20 to 25° C. The nitric acid solution was added dropwise to the vigorously stirred urea solution at 2 to 4° C. over a period of 30 minutes. After stirring 15 minutes longer, the reaction mixture was poured, with vigorous stirring, into 1252 parts ice.

The product was recovered by filtration in a yield of 87.7% nitrourea.

Example VII

Into a reactor fitted for mechanical stirring and internal and external cooling, 454 parts of urea was added in small portions to a mixture of 865 parts of sulfuric acid (sp. gr. 1.84) and 756 parts of oleum (31.5%, $SO_3$) at 20–25° C.

A second solution was prepared by combining 576 parts of fuming nitric acid (90% $HNO_3$) with 1980 parts of oleum (31.5% $SO_3$) at 20 to 25° C. The nitric acid solution was added over a period of 50 minutes to the urea solution at −5 to 0° C. The clear reaction solution was stirred for 75 minutes longer and poured into 9475 parts of ice. The product was recovered by filtration and again stirred into 1000 parts of ice and water to remove more of the residual acid.

The resulting slurry was again filtered to give a yield of 73.3% nitrourea.

Example VIII

In this example a urea solution, and a nitric acid solution were first prepared and then combined continuously in a nitration unit formed by a tube type reactor provided with adequate cooling and agitation means.

After equilibrium conditions had been established timed runs were made while recording the conditions of the reaction, the amount of reactants added and the amount of product collected. The product solution was run into cooled water in a dilution chamber and the resulting mixture filtered with suction. The product was macerated with cold acetic acid, and again filtered.

In one run, the urea solution was prepared by combining 454 parts of urea at 25 to 30° C. with a mixture of 756 parts of oleum (31.5% $SO_3$) and 856 parts of sulfuric acid (sp. gr. 1.84). The nitric acid solution was prepared by combining 576 parts of fuming nitric acid (90% $HNO_3$) with 1980 parts of oleum (31.5% $SO_3$) at 30 to 35° C.

These solutions were combined in the nitration unit at such a rate that a temperature of 7 to 10° C. and a residence time of 10.8 minutes was maintained in the reactor. The reactant solutions were combined in such a ratio that 69.5 parts of nitric acid and 934 parts of sulfuric acid per 60 parts of urea was used. The reaction mixture was diluted at the rate of 1060 parts of water per 60 parts or urea used to precipitate the product which was recovered by filtration.

The yield of nitrourea was 65.2%.

Example IX

In this example the same equipment and compositions of reactant solutions as used in Example VIII were again used. These solutions were combined at such a rate that a temperature of 5 to 12° C. and a residence time of 5.0 minutes was maintained in the reactor. The reactant solutions were combined in such a ratio that 69.5 parts of nitric acid and 926 parts of sulfuric acid to 60 parts of urea was used. The reaction mixture was diluted in the ratio of 1060 parts of water per 60 parts of urea used to precipitate the product recovered by filtration. The yield of nitrourea was 43.2%.

Example X

The same equipment and composition of reactant solutions as used in Example VIII were again used. The solutions were combined at such a rate that a temperature of −20 to −30° C. and a residence time of 13.0 minutes was maintained in the reactor. The reactant solutions were combined in such a ratio that 79.5 parts of nitric acid and 1140 parts of sulfuric acid per 60 parts of urea were used. The reaction mixture was diluted in the ratio of 1870 parts of water per 60 parts of urea used to precipitate the product which was recovered by filtration. The yield of nitrourea was 35.3%.

Example XI

The same equipment and composition of reactant solutions used in Example VIII were again used. These solutions were combined at such a rate at a temperature of −3 to 0° C. and a residence time of 24.3 minutes was maintained in the reactor. The reactant solutions were combined in such a ratio that 69.7 parts of nitric acid and 965 parts of sulfuric acid per 60 parts of urea were used. The reaction mixture was diluted in the ratio of 970 parts of water per 60 parts of urea used to precipitate the product recovered by filtration. The yield of nitrourea was 72.3%.

While various other concentrations of sulfuric acid can be used as those skilled in the art will appreciate, we have obtained very satisfactory results when the concentration of our urea solvent has varied in strength from concentrated sulfuric acid (sp. gr. 1.84) to fuming sulfuric acid (oleum) containing 14.7% $SO_3$. The use of a much more concentrated solution, i.e., containing much more free $SO_3$, is limited by the formation of solids when the solvent temperature is reduced; and the use of a much weaker solution than concentrated sulfuric acid results in reduced yield.

Preferably the sulfuric acid solution of urea, and the nitric acid solution, should be prepared just prior to use and kept only a short time. However, such sulfuric acid solutions of urea can be kept without significant deterioration for several hours; the nitric acid solution can also be kept for a number of hours if it is cooled to ambient temperatures.

Although the urea is preferably dissolved in the sulfuric acid at a temperature of between about 0° to 35° C., this temperature may vary, depending upon the sulfuric acid concentration, upwardly to about 100 or 120° C.

The nitration step of our process has been carried out at temperatures ranging from −30° C. to 12° C., although we prefer to add the nitric acid solution to the sulfuric acid solution of the urea at around −5 to +10° C. Generally, higher temperatures result in somewhat higher yields of nitrourea, although there is an accompanying disadvantage in that there is an undesirable amount of foaming during the reaction.

A foaming problem may also be encountered when the temperature of the drowning medium is allowed to rise to about 15 to 20° C., and for this reason we prefer to maintain its temperature within the range of about 0° C. to 10° C., water and ice commonly being used for this purpose. Nitric acid of various concentrations may be used for the nitration, and may be admixed with sufficient oleum to dehydrate the reaction medium; we have found solutions ranging from 70% (sp. gr. 1.42) to 90% (fuming) acid to be very satisfactory, the more concentrated acid being generally preferable, because less oleum need then be used to produce a more nearly anhydrous reaction medium.

We claim:

A method for producing nitrourea which comprises preparing a solution of urea by dissolving urea in a solvent selected from the group consisting of concentrated sulfuric acid and sulfuric acid containing free $SO_3$, combining said urea solution with a mixture of nitric acid and sulfuric acid containing free $SO_3$, in a reactor at a rate such that a temperature of about minus 5° C. to plus 10° C. and a residence time of about 5 to 30 minutes is maintained in the reactor, and then diluting the reaction mixture with water while maintaining the temperature thereof between about 0° C. and 10° C., to precipitate nitrourea.

References Cited in the file of this patent

UNITED STATES PATENTS

| | | |
|---|---|---|
| 2,311,784 | Spaeth | Feb. 23, 1943 |
| 2,449,843 | Filbert | Sept. 21, 1948 |

FOREIGN PATENTS

| | | |
|---|---|---|
| 471,279 | Canada | Feb. 6, 1951 |

OTHER REFERENCES

Ingersoll et al.: Org. Syn., vol. 5, pages 85–86 (1925).
Davis et al.: J.A.C.S., vol. 51, page 1794 (1929).
Holstead: J. Chem. Soc., pages 3341–52 (1953).